UNITED STATES PATENT OFFICE.

WILLIAM H. ROYSTONE, OF SCRANTON, PENNSYLVANIA.

PROCESS OF PRODUCING TOILET CREAM.

1,017,595.  Specification of Letters Patent.  Patented Feb. 13, 1912.

No Drawing.  Application filed November 3, 1911. Serial No. 658,422.

*To all whom it may concern:*

Be it known that I, WILLIAM H. ROYSTONE, a citizen of the United States, residing at Scranton, in the county of Lackawanna and State of Pennsylvania, have invented certain new and useful Improvements in Processes for Producing Toilet Cream; and I do hereby declare the following to be a full, clear, and exact description of the invention, such as will enable others skilled in the art to which it appertains to make and use the same.

This invention relates to the process of manufacturing toilet cream and has for an object to provide a new and improved process insuring economy in manufacturing and superiority in product.

In the preferred manner of practicing the process one quart of water is placed in a vessel and five ounces of caustic potash dissolved therein. Such dissolving is aided by stirring and after being completely dissolved this solution is permitted to stand not less than twenty-four hours.

A second compound is formed by placing one gallon of water in a vessel and bringing it to boiling point under atmospheric pressure and placing therein four pounds of stearic acid and one quart of glycerin. The introduction of the stearic acid and glycerin into the boiling water will lower the temperature which should again be raised to a temperature of 156° F., at which temperature the stearic acid will be entirely melted. A vessel is now employed and into this vessel is placed two gallons of water, which is brought to the boiling point under atmospheric pressure and into such boiling water the above solution is introduced and the temperature again raised to the boiling point. The solution thus formed is now introduced into the above named compound while such compound of stearic acid and glycerin is at the boiling point and stirred to thoroughly incorporate the ingredients and until the contents have been raised again to the boiling point and for a minute or two after reaching such boiling point. After such thorough incorporation the mass may be boiled without stirring and should be boiled for a period of fifteen minutes. The composition is now completed and should be poured into jars while still hot and without any stirring or other manipulation after or during cooling. To prevent evaporation and deterioration the jars should be sealed air tight as by employing a coating of paraffin or other impervious wax.

While the ingredients and steps of the process as above described have been found from long experience to be the best for producing the highest grade material it is, of course, obvious that the various steps might be departed from to a limited extent without departing from the spirit of the invention.

I claim:

The process of producing a toilet cream consisting in employing an alkaline solution consisting of one quart of water and five ounces of caustic potash, melting four pounds of stearic acid in a mixture of one gallon of water and one quart of glycerin, diluting the caustic potash solution with two gallons of water and raising to a temperature of 212° F., pouring the boiling solution into the stearic acid compound, stirring until admixed and boiling until complete saponification takes place.

In testimony whereof I affix my signature in presence of two witnesses.

WILLIAM H. ROYSTONE.

Witnesses:
WM. A. WARD,
ISABEL WEBBER.